(12) United States Patent
Bahnmiller

(10) Patent No.: US 8,635,828 B2
(45) Date of Patent: Jan. 28, 2014

(54) COMPOSITE INSULATING BUILDING PANEL AND SYSTEM AND METHOD FOR ATTACHING BUILDING PANELS

(75) Inventor: Jeffrey A. Bahnmiller, Boston, MA (US)

(73) Assignee: Pacific Insulated Panel LLC, Arlington, WA (US)

( * ) Notice: Subject to any disclaimer, the term of this patent is extended or adjusted under 35 U.S.C. 154(b) by 0 days.

(21) Appl. No.: 13/005,664

(22) Filed: Jan. 13, 2011

(65) Prior Publication Data

US 2011/0197530 A1     Aug. 18, 2011

Related U.S. Application Data

(60) Provisional application No. 61/294,564, filed on Jan. 13, 2010.

(51) Int. Cl.
*E04B 2/30*     (2006.01)

(52) U.S. Cl.
USPC .............................. 52/489.1; 52/309.4; 52/762

(58) Field of Classification Search
USPC .................. 52/309.4, 762, 408, 309.8, 309.9, 52/309.11, 474, 483.1, 489.1, 489.2, 412, 52/413
See application file for complete search history.

(56) References Cited

U.S. PATENT DOCUMENTS

| | | | | |
|---|---|---|---|---|
| 3,111,787 | A * | 11/1963 | Chamberlain | 52/309.9 |
| 3,121,649 | A * | 2/1964 | Oliver | 52/746.11 |
| 3,468,086 | A * | 9/1969 | Warner | 52/173.1 |
| 3,505,770 | A * | 4/1970 | Bennett | 52/309.13 |
| 3,729,879 | A * | 5/1973 | Franklin | 52/406.2 |
| 3,919,443 | A * | 11/1975 | Porter | 428/81 |
| 3,998,016 | A * | 12/1976 | Ting | 52/323 |
| 4,118,533 | A * | 10/1978 | Hipchen et al. | 442/371 |
| 4,635,422 | A * | 1/1987 | Nowack et al. | 52/406.1 |

(Continued)

FOREIGN PATENT DOCUMENTS

| | | |
|---|---|---|
| GB | 2 238 808 A | 6/1991 |
| JP | 2006188897 A | 7/2006 |
| JP | 2007032066 A | 2/2007 |

OTHER PUBLICATIONS

International Search Report and Written Opinion in PCT/US2011/021094, 9 pages (Jan. 12, 2012).

(Continued)

*Primary Examiner* — William Gilbert
*Assistant Examiner* — James Ference
(74) *Attorney, Agent, or Firm* — Rothwell, Figg, Ernst & Manbeck, P.C.

(57) ABSTRACT

An insulation panel includes a foam core with a reinforced and vapor-impervious facing disposed on one or both sides of the core. A portion of the facing extends beyond the core and has an adhesive so that the overhanging portion can be secured to an abutting panel to cover a seam between the abutting panels. A fixture for forming the panel includes two heated platens, preferably provided with a textured surface, held apart by a spacer and between which the facing is mechanically suspended. An installation of the insulation panel includes panel-securing elements attached to frame elements of the building and including first and second flanges spaced apart by the thickness of the panel. A portion of the insulation panel is disposed between the first and second flanges, the first flange is secured to the frame element, and a cover panel disposed over the insulation panel is secured to the second flange.

16 Claims, 7 Drawing Sheets

(56) References Cited

U.S. PATENT DOCUMENTS

| | | | | |
|---|---|---|---|---|
| 4,709,523 A * | 12/1987 | Broderick et al. | | 52/506.05 |
| 4,984,406 A * | 1/1991 | Friesen | | 52/588.1 |
| 5,001,879 A * | 3/1991 | Paliwoda | | 52/309.8 |
| 5,062,250 A * | 11/1991 | Buzzella | | 52/586.2 |
| 5,085,022 A * | 2/1992 | Paliwoda | | 52/309.8 |
| 5,247,770 A * | 9/1993 | Ting | | 52/309.9 |
| 5,497,589 A * | 3/1996 | Porter | | 52/309.7 |
| 5,927,032 A * | 7/1999 | Record | | 52/309.11 |
| 5,979,136 A * | 11/1999 | Marschak | | 52/588.1 |
| 6,006,481 A * | 12/1999 | Jacobs | | 52/309.9 |
| 6,138,420 A * | 10/2000 | Fyfe | | 52/262 |
| 6,293,069 B1 * | 9/2001 | Monda et al. | | 52/460 |
| 6,298,609 B1 | 10/2001 | Bifano et al. | | |
| 6,427,390 B1 * | 8/2002 | Thies | | 52/58 |
| 6,505,448 B2 * | 1/2003 | Ito | | 52/474 |
| 6,581,348 B2 * | 6/2003 | Hunter, Jr. | | 52/408 |
| 6,591,559 B2 * | 7/2003 | Contreras et al. | | 52/101 |
| 6,698,144 B1 * | 3/2004 | Larson | | 52/202 |
| 6,786,011 B2 * | 9/2004 | Mares | | 52/62 |
| 6,796,093 B2 * | 9/2004 | Brandes | | 52/309.8 |
| 6,968,659 B2 * | 11/2005 | Boyer | | 52/302.4 |
| 7,036,284 B1 * | 5/2006 | Larson | | 52/506.1 |
| 7,726,079 B2 * | 6/2010 | Raineri | | 52/209 |
| 7,757,450 B2 * | 7/2010 | Reyes et al. | | 52/396.05 |
| 2001/0047628 A1 * | 12/2001 | Mouton et al. | | 52/144 |
| 2004/0221518 A1 * | 11/2004 | Westra | | 52/79.1 |
| 2005/0076611 A1 | 4/2005 | Crawford | | |
| 2006/0150553 A1 * | 7/2006 | Reyes et al. | | 52/393 |
| 2007/0066113 A1 | 3/2007 | Gansemans | | |
| 2008/0086965 A1 | 4/2008 | Metz et al. | | |
| 2008/0289279 A1 | 11/2008 | Hannan et al. | | |

OTHER PUBLICATIONS

Author Not Indicated, BASF Corporation, Technical Product Data, Autofroth® 100-B-0718 Resin/AutoFroth® 9300A Isocyanate Rigid Polyurethane Foam System, Revision Date: Oct. 10, 2008, 2 pages.
Lstiburek, J., Understanding the Terms Barrier and Retarder for Vapor and Air, Feb. 2002, 3 pages.
Author Not Indicated, Lamtec® Product Selection Guide: Vapor Retarders for Metal Building Insulation, LAMTEC® Corporation, Jan. 2004, pages.
International Preliminary Report on Patentability Application No. PCT/US2011/021094, mailed Jul. 26, 2012, 5 pages.

* cited by examiner

COMPOSITE INSULATING BUILDING PANEL AND SYSTEM AND METHOD FOR ATTACHING BUILDING PANELS

CROSS-REFERENCE TO RELATED APPLICATIONS

This application claims the benefit under 35 U.S.C. 119(e) of U.S. Provisional Application No. 61/294,564, filed Jan. 13, 2010, the disclosure of which is hereby incorporated by reference in its entirety.

FIELD OF THE INVENTION

This invention relates in general to composite panels for industrial insulation, and more particularly to composite panels including two composite facings, at least one of which overhangs a foamed-in-place plastic core, with an adhesive placed on the overhang, as well as systems, devices, and methods for manufacturing and installing such panels.

BACKGROUND OF INVENTION

With increasing emphasis being placed on thermal performance of industrial insulation and an increasing number of organizations and regulatory bodies such as ASHRAE and the DOE, pressure is being placed on an industry that has lacked an economical solution that encompasses both a continuous insulated envelope and an insulation system that addresses air barrier and energy efficiency in metal buildings.

Laminated fiberglass insulation used in pre-manufactured buildings has limitations as it does not provide a continuous insulation envelope. Laminated fiberglass is applied over the exterior of the building structure or sub framing, and roof and siding panels are installed over the top of the insulation. When this method is used, the fiberglass laminate is compressed over the framing by the roof and siding panels, thereby degrading the thermal performance of the insulation. Liner systems have been developed to combat this problem by applying a lining to the inside of the building sub framing, i.e. the gifts and perlins, and filling this cavity with fiberglass batts. While this system addresses the issue of compressed fiberglass it still carries most of the drawbacks of a loose fill insulation system. Loose fill fiberglass systems are virtually unable to block air infiltration and water vapor, which can drastically reduce the thermal performance of the insulation system. Additionally these systems are labor intensive and their effectiveness depends heavily on the quality of the installation, which may not be consistent from building to building.

An alternative to laminated fiberglass and loose fill insulation includes a wide range of rigid insulation that is currently on the market, none of which fully address the needs of pre-manufactured buildings. Most commonly, rigid insulation having a single layer of un-reinforced facing is installed over the building sub faming in a manner similar to a laminated fiberglass system. Once the rigid insulation is installed, all adjoining seams must be sealed with tape. Such system are not tailored to pre-manufactured building and are labor intensive. Flexible faced insulating system that are available today are not designed to stand up to the exposed industrial environment in which they are used, while providing a quality finish.

SUMMARY OF THE INVENTION

One aspect of this invention is to provide an improved composite insulation panel system incorporating an integrated seal tab that allows adjoining panels to be jointed during installation with a pre-installed adhesive. This enables the installed panels to have a continuous air and vapor resistant barrier in addition to increased strength and durability of the composite panel through integrated fiber placement. Another aspect of this invention is to provide an improved method of manufacturing a composite panel using textured mold inserts, which allow air trapped between the heated platens and the composite facing to escape. This also imparts an embossed texture onto the panel surfaces that aids in decreasing the amount of blistering and increases the esthetics of the panel. Another aspect of this invention is to provide a method of installation that allows the panel to be installed on the exterior of the framing structure of an industrial steel building, while allowing the building manufacturer to use current trims and flashings. In general, changes will only be made to the lengths of siding and roofing panels, while maintaining an adequate system for securing this sheeting to the building. Another objective of this invention is to provide improved thermal isolation and air/vapor impenetrance to composite panel terminations.

BRIEF DESCRIPTION OF THE DRAWINGS

The invention and its many attendant objects and advantages will become better understood upon reading the description of the preferred embodiment in conjunction with the following drawings, wherein.

DETAILED DESCRIPTION OF THE INVENTION

Figure 1:
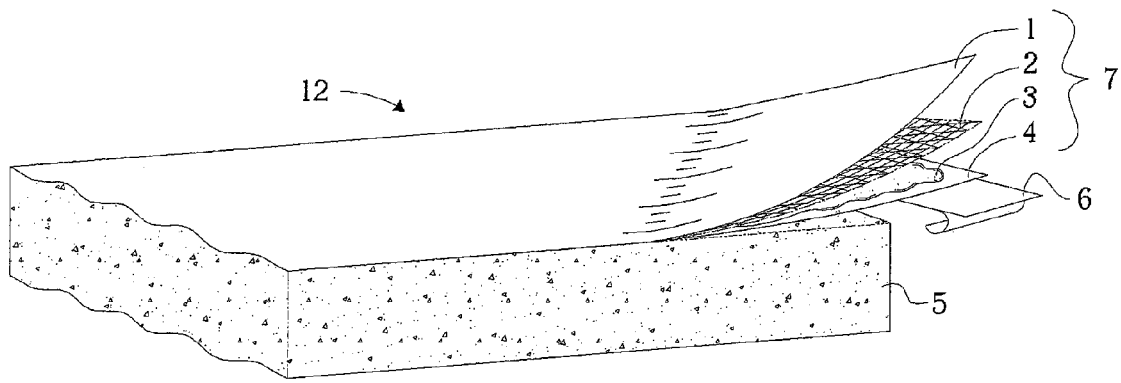
FIG. 1 is a perspective view of a composite insulation panel embodying aspects of the invention wherein the layers have been pulled back and exposed on one side of the composite panel. The same layers that have been exposed may also be present on the second major side of the composite.
Figure 2:
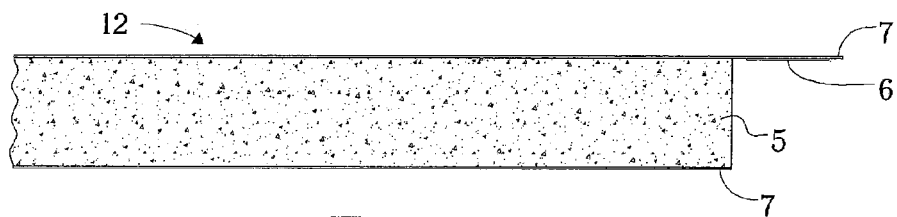
FIG. 2 is a side view of the composite structure shown in FIG. 1 without the layers of said composite exposed.

Turning now to the drawings, wherein like reference characters designate identical or corresponding parts, and more particularly to FIG. 1 thereof, a composite insulation panel 12 embodying aspects of the invention includes a facing 7 disposed on one side, or, alternatively, both sides, of a foam core 5. Top facing 7 of the composite panel 12 is shown in FIG. 1 pulled back to expose its components. Facing 7 may comprise, but is not limited to, a vapor impervious skin 1, preferably between 2.5 and 400 micron, beyond which a reinforcing layer may be redundant. By way of a specific example the skin 1 is comprised of metalized polypropylene. Other suitable materials include a wide range of polymeric materials; for example, polystyrene, polyethylene, polypropylene, polyurethane, and polyvinylchloride. In some cases, for costs savings, a facing material can become increasingly thin to a point at which it is no longer a vapor impervious skin. Thinner skins can be more cost effective, but have difficulty meeting perm ratings. This is the reason that reinforcing is so important. When this occurs skin 1 must be coated to achieve a desirable level of vapor permeance By way of further specific example, the skin 1 is comprised of a layer of aluminum with a thickness of, for example, 7.6 microns and a barrier coating of elastomeric polymer of, for example, 2.5 microns thickness.

Facing 7 further includes reinforcing 2 added to give the facing 7 its desired strength. Reinforcing 2 is comprised of, but not limited to, continuous strands of organic and non-organic fibers. In particular, continuous fibers are orientated in a mesh, or woven, pattern that maximizes composite properties. By way of example, glass and polyester fibers are presented in a tri-directional weave with at least one axis of said weave orientated along the length of composite panel 12, which can be produced in custom lengths to fit building dimensions. In some embodiments, reinforcing 2 may comprise fiberglass, Kevlar®, or carbon fiber. The width of the panel can also be customized, but 42 inches is preferable for ease of installation. To further quantify its performance, facing composite 7 should obtain minimum burst strength 25 psi and a minimum puncture resistance of 50 beach units. Furthermore, a minimum tensile strength of 25 lbs/inch width should be obtained Even further, facing 7 should have a class I water vapor transmission rating which range is defined by 0.0 perm to 0.1 perm. The permeance of the composite facing should be equivalent to or greater than the permeance of the foam core 5. Heretofore prior art has put little emphasis on this aspect due to the adequate permeance rating of foam used. When considering the preferred embodiment of the insulating system presented, it becomes apparent that the installed seams should also meet a class I rating. Additionally, all facings should have a class I rating for flame spread and smoke development. Ideally, the composite insulation panel 12 has a class I or class A rating with regard to flame spreading and smoke propagation when tested to ASTM E84 criteria. Furthermore, Sections 2603.4 through 2603.7 of the international building code require that foam plastics must be separated from the interior of a building by a 15-minute thermal barrier unless special approvals in outlined in Section 2603.9 of the international building code are met. Preferably, the composite insulation panel 12 of the current invention satisfies the special approvals of Section 2603.9.

Facing 7 further includes a backing 4 (often referred to as a "Kraft backing"), which is used as a bonding isolation barrier. This isolation enhances bonding between the foam and the facing and allows for a greater diversity of facings 1 that can be incorporated into the final composite insulation panel 12. Often molecular bonding between dissimilar plastics becomes problematic due a high degree of polymer chain alignment and hydrogen paring at the surface of the material. By way of example, ultra high molecular weight polyethylene has a tremendously low surface energy when compared to polyurethanes. By using backing 4 to isolate the materials, an adhesive 3 can be selected to molecularly and mechanically bond with facing film 1 and Kraft backing 4, thereby locking fiber-reinforcing 3 interstices in place and forming the facing composite 7, which in turn is bonded to the foam core 5 in the same manner that the Kraft paper is attached to the film and reinforcing.

Suitable materials to be used as a facing composite include air barriers and vapor retarders available from Lamtec® Corporation, Flanders, N.J., including product numbers WMP-30 and R-3035 HD. Another suitable product is "Gymguard" by Lamtec.

The thickness of the foam core 5 can vary from ½ inch to 6 inches depending on the degree of insulation required. The core will have a density of 1.8 to 2.6 pcf (pounds per cubic foot), preferably about 2.3 pcf.

By way of example the plastic foam core will be made of polyurethane. Polyurethane foam with the addition of flame retardant is desirable due to its strength characteristics, thermal performance, fire retarding properties, as well as its ability to bond to facings. One example of the polyurethane foam that is suitable for this invention is as follows: Resin; 70 parts Polyol, 12 parts Flame Retardant, 3 Parts Surfactant, 2 parts Catalyst, 5 parts Propylene Carbonate, 15 parts 1,1,1,3,3-pentafluoropropane(HFC-245fa). Isocyanate; 55 parts P-MDI, 38 parts Diphenylmethane-4,4'-diisocyanate (MDI), 10 parts MDI Mixed Isomers. A suitable rigid polyurethane foam system is a two-component polymeric MDI based system available from BASF and comprises Autofroth® 100-B-0718 resin and Autofroth® isocyanate.

The resin components and isocyanate components are mixed individually and in turn are mixed together while being injected into the panel fixture. Heat of reaction along with mold temperatures causes the HFC-245fa to vaporize in the mixture cause foaming to take place. The panel remains in the mold until peak exotherm has occurred. The molding time depends on the panel thickness, but usually falls in the range of 25 to 45 minutes for the range of panels encompassed by this invention.

Additionally, polyurethane foam composite can be co-blown. This means that the resin will incorporate more than one blowing agent. By way of further example, a co-blown polyurethane foam resin component is as follows: 70 parts Polyol, 12 parts Flame Retardant, 3 parts Surfactant, 2 parts Catalyst, 5 parts Propylene Carbonate, 5 parts 1,1,1,3,3-pentafluoropropane(HFC-245fa), 12 parts tetrafluoroethane.

While polyurethane foam is preferred in this invention, other cellular expanded polymeric materials can be used. For example, urethanes, polystyrenes, Polyvinyl chlorides, isocyanurates, epoxies, phenolics, with variations and mixtures of these that have density between 1 and 3 pcf and a closed cell structure ranging from 90-97% closed.

Figure 3:
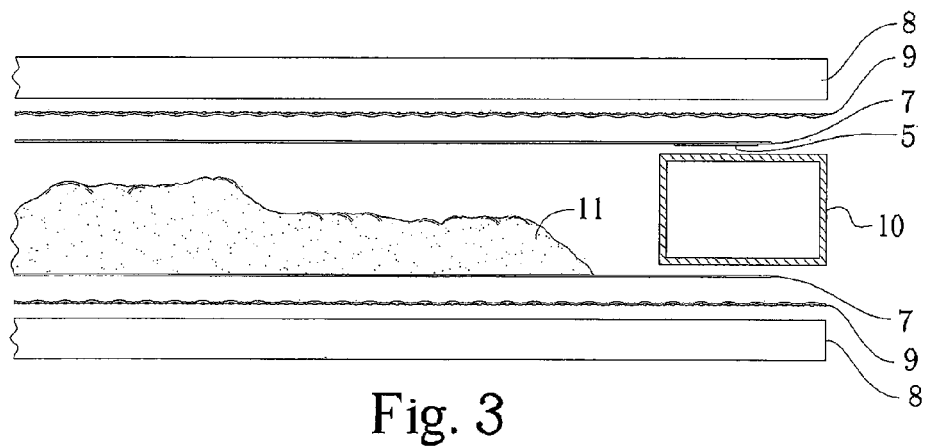
FIG. 3 is an exploded view a composite panel and panel molding fixture prior to expansion of the foam.

A fixture assembly for forming a composite insulation panel is shown in FIG. 3. During the formation process, composite facing 7 is mechanically suspended by hydraulic force between two heated platens 8 held apart by an edge spacer 10. The platen temperature is held between 85° F. and 115° F., preferably a temperature of 95° F. is reached at the surface of the textured insert 9. The spacer 10 shown in FIG. 3 is configured such that the composite panel 12 will have side edges that are substantially perpendicular to panel facing 7. Spacer 10 can also be configured to give the composite panel better thermal characteristics. By way of example spacer 10 can be configured to give the panels edges a tongue-n'-groove, or ship-lap characteristic increasing the performance of the panel by reducing thermal bypass.

Textured mold insert 9 may be used on the surfaces of the heated platens 8 to allow trapped air to escape from behind composite facing 7 as the foam 11 expands in the molding fixture. Without venting this area, air can become trapped between the facing 7 and the heated platens 8 and the composite panel will not fill properly. The texture is also used to minimize the affect of blisters. Blisters occur when worm holes, bubbles of blowing agent, amass at the interface between the expanding foam 11 and the facing 7. The texture also helps prevent creases in the facing 7 by allowing the facing to be stretched into the texture when the foam expands. The textured insert improves the flow of expanding foam 11 in the mold, decreasing the amount of gas that becomes trapped at the surface of the foam. Any small amount of gas that does become trapped is camouflage by the texture that the panel as taken on.

Suitable textures to be used as a textured mold inserts are available from Rigidized® Metals Corporation, Buffalo, N.Y., including product number 1UN.

The composite insulation panel can be molded both by discontinuous or continues process. In discontinuous operation shown in FIG. 1, the panel's facing 7 is precut to the desired panel length and inserted into the molding fixture of equal length and foamed. All components shown in FIG. 1 are static when the foam is injected/poured into the molding fixture. In continuous operation, also depicted by FIG. 1, the panel's facing 7 is continually pulled off a roll into the mold by the movement of the molding cavity. A top and bottom textured belt; separated by the thickness of the desired panel, moves in an elongated circular orbit to hold the composite in place while the foam expands and cures. As the panel exits the moving belts, the panel is cut to length via a programmed cut-off saw.

Upon exiting the molding fixture, the panel 12 has facings that overhang all major sides of the composite. At this point any number of these sides may become a tape tab. The tape tab 6 can be installed before or after the molding. Preferably the tape is automatically rolled onto the facing as it comes off its roll. Tape that is applied to the width of the panel is usually installed manually after the molding operation.

FIGS. 4-9 show various aspects of a building assembly including an installation of insulation panels embodying aspects of the present invention.

Figure 4:
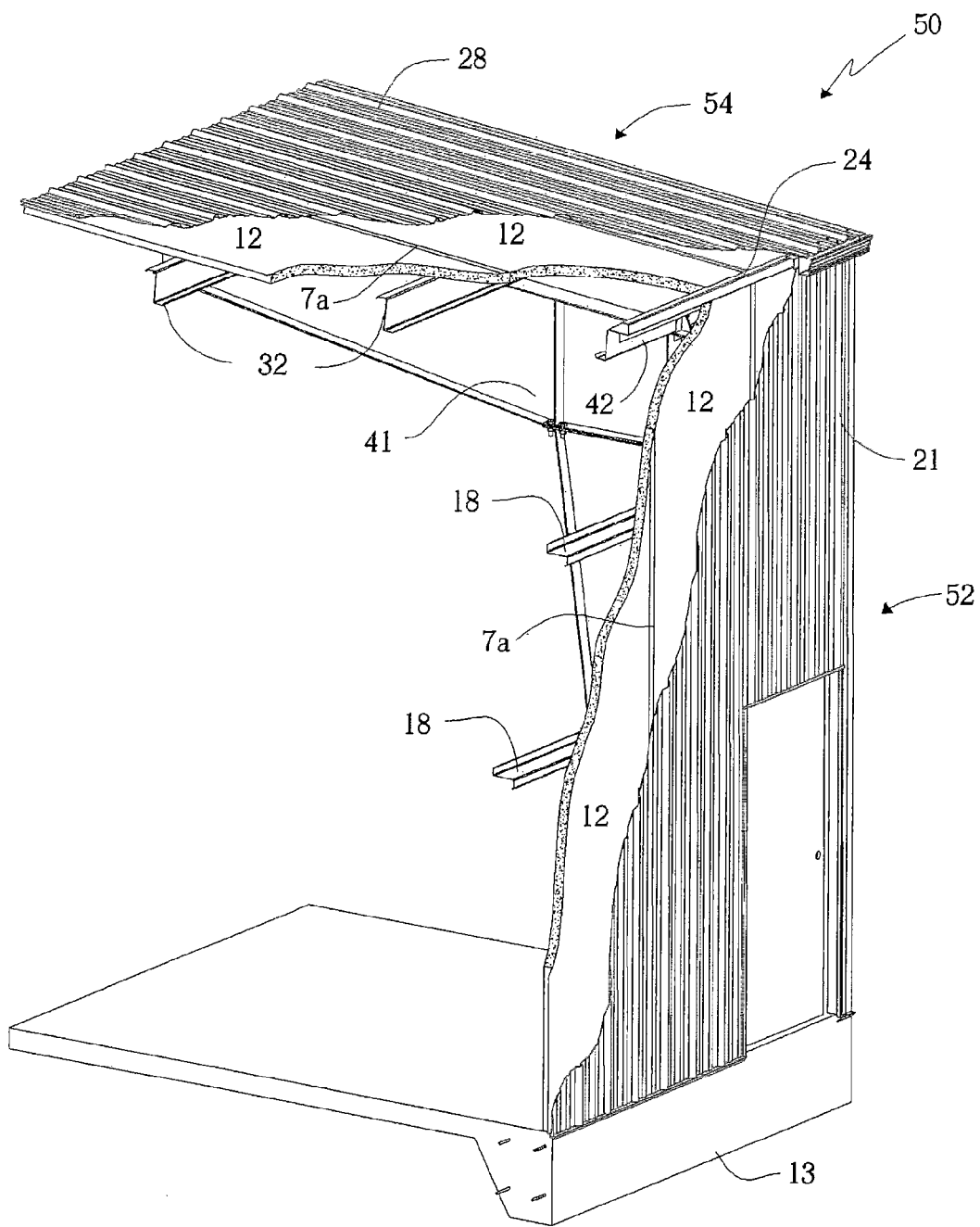
FIG. 4 is a partial perspective, cut-away view of a metal building embodying aspects of the present invention.
Figure 5:
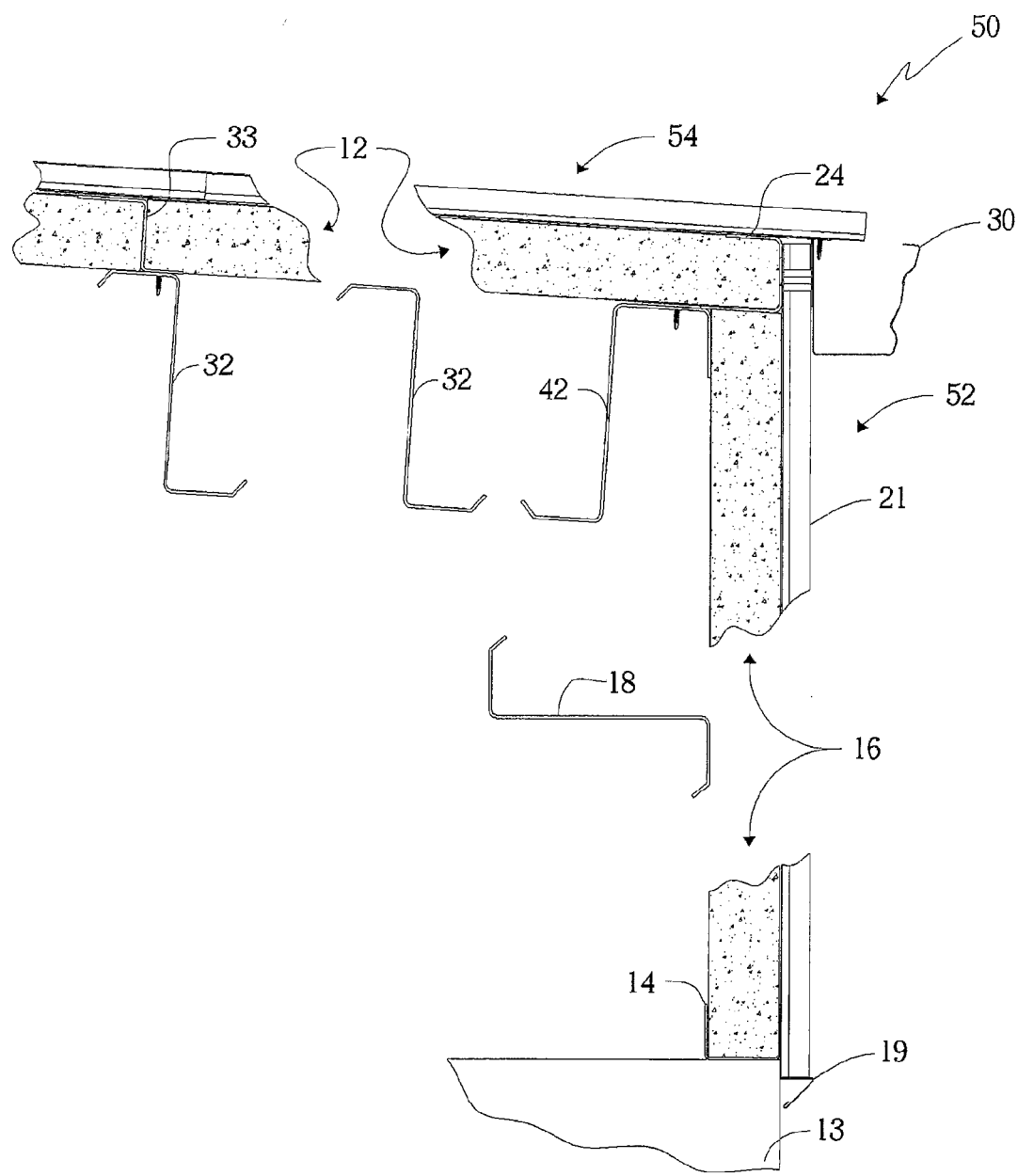
FIG. 5 is a partial cross-section of the building of FIG. 4.

FIG. 4 shows a partial perspective cut-away view of a building 50 embodying aspects of the present invention. FIG. 5 shows a partial side cross-section of the building 50. Building 50 includes a number of walls 52 and a roof 54. The building 50 is supported on a foundation 13, which may comprise a concrete curb, grade beam, or other foundation or slab material. In a typical installation, the grade beam is the load bearing cement foundation that can be poured level with the building's grade.

Wall 52 includes frame elements comprising main frame 41 and girts 18. A girt is typically made from cold-rolled galvanized steel ranging from 10 to 18 gauge thickness and is conventionally made into the general shape of a "Z" but can be made in other shapes as well. The girts 18 are typically secured in a horizontal orientation with respect to vertical support posts and support wall panels 21, which are typically painted steel panels fastened to the outside of the building frame through insulation panels 12 disposed between the wall panels 21 and the girts 18. Wall panels 21 are typically made from 20 to 29 gauge material and come in many styles and sizes. The wall panels 21 may secured to (or with respect to) the girts 18 by means of fasteners (not shown), such as self-tapping screws that extend through the panel 21 and the insulation panel 12 and into the girt 18. The fasteners may include a washer formed from an elastomeric material (e.g., neoprene) for sealing the panel and minimizing moisture penetration though the screw hole. Further details concerning the installation assembly of the wall panels 21, girts 18, and the insulation panels 12 are described below.

As noted, the insulation panels 12 are disposed between the girts 18 and the wall panels 21, with abutting insulation panels 12 being temporarily secured to one another by facing overhang 7a, secured by tape tab 6, and cap screws with a fender washers if necessary (not shown) until they can be secured in place by means of fasteners driven through the wall panels 21 and insulation panels 12 and into the girts 18. In addition to temporarily holding abutting insulation panels 12 together during installation, facing overhang 7a also effects an air, thermal, and moisture barrier at the junction (i.e., seam) between adjacent, abutting insulation panels 12.

Roof 54 includes a frame comprising perlins 32 positioned at spaced locations along the span of the roof 54, with an eave strut 42 supporting the free edge of the roof 54. Roof panels 28 are secured with respect to the perlins 32 and eave strut 42, with composite insulation panels 12 disposed between the roof panels 28 and the perlins 32 and eave strut 42. Further details concerning the installation assembly of the roof panels 28, perlins 32, eave strut 42, and the insulation panels 12 are described below. Like the wall panels 21, the roof panels 28 are typically formed from painted steel of 20 to 29 gauge thickness and may be provided in many styles and sizes. Abutting insulation panels 12 can be temporarily secured to one another by the facing overhang 7a and tape tab 6, and a cap screws with fender washers if necessary (not shown) during installation until the roof panels 28 are secured with respect to the perlins 32 and eave strut 42 over the insulation panels 12. Again, in addition to temporarily holding abutting insulation panels 12 together during installation, facing overhang 7a also effects an air, thermal, and moisture barrier at the junction (i.e., seam) between adjacent, abutting wall panels 12.

Figure 6:
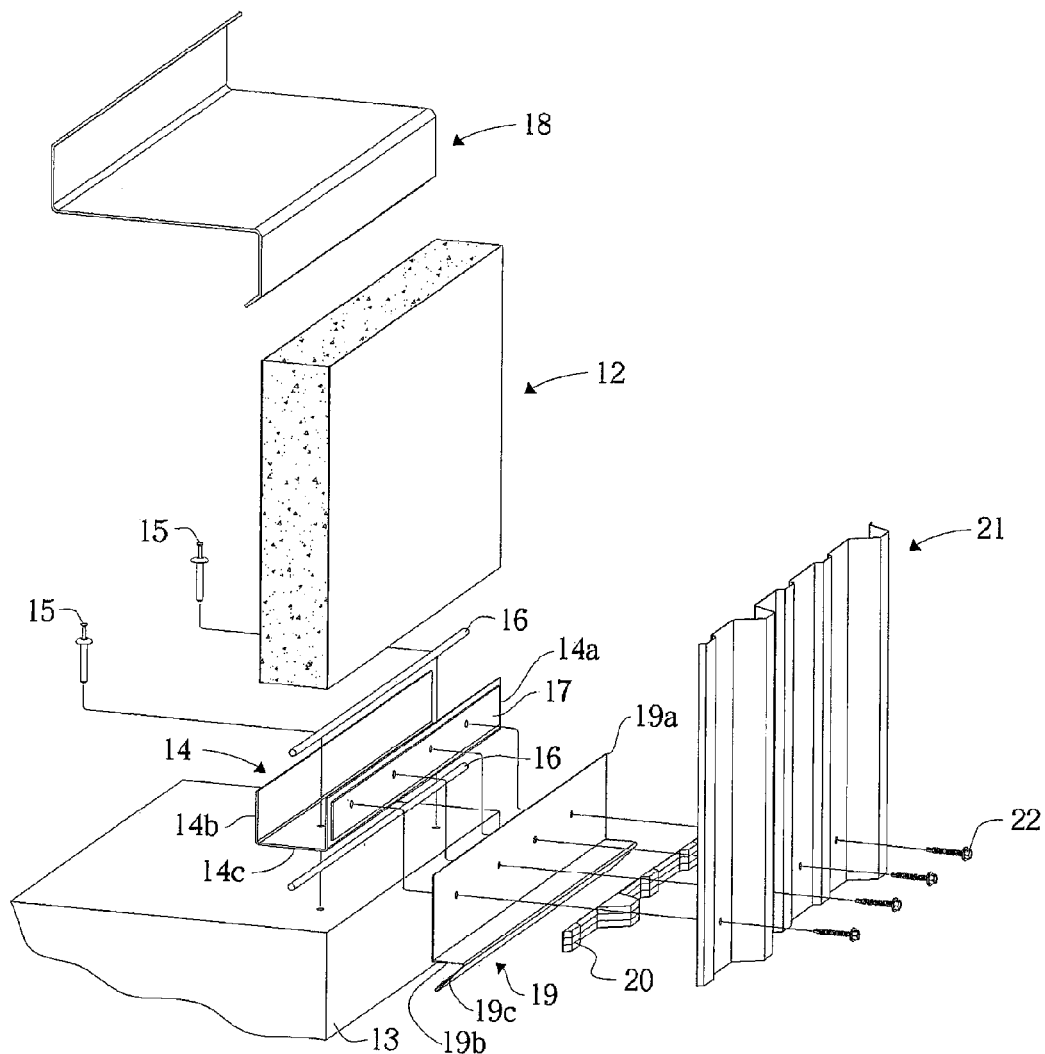
FIG. 6 is an exploded perspective view of a composite panel installation assembly at the base of a building structure, or at the building's grade beam level.

FIG. 6 is an exploded perspective view of a lower portion of the wall 52 showing details of the assembly of the insulation panels 12 and wall panels 21 with respect to the grade beam 13. The assembly includes a base member 14 comprising a channel having two side walls 14a, 14b connected by a web 14c. In the illustrated embodiment, base member 14 comprise a "C"-channel with an inside dimension between side walls 14a, 14b corresponding to the thickness of the composite insulation panel 12. Base member 14 may be formed from 16 gage galvanized steel sheet.

Base member 14 is secured with respect to the building's grade beam 13, for example with concrete anchors 15 (or other suitable fasteners), which may be specified by the building manufacturer, extending through openings formed in the web portion 14c of the base member 14. A bead or layer of sealant 16, such as non-skinning butyl sealant, may be provided between the base member 14 and the grade beam 13.

The lower ends of the insulation panels 12 then nest into the base member 14, and a bead or layer of sealant 16, for example, non-skinning butyl sealant, is preferably applied between the top of the channel's web 14c and the bottom edge of the insulation panel 12. As can be seen, especially in FIG. 5, the building's grade-beam 13 is extended beyond the girt line 18 of the building by at least the thickness of the insulation panel 12 so as to provide a supporting foundation for the base member 14 and the insulation panels 12. The distance by which the grade beam 13 is extended is at least the thickness of the insulation panels 12, which is typically determined by local insulation codes and regulations.

The outer side wall 14a of the base member 14 is covered with a thermal isolator 17, which may comprise double sided foam adhesive tape. The thermal isolation tape 17 may comprise ⅛" closed-cell foam with double-sided adhesive applied to both surfaces of the tape and is used to separate two construction materials to reduce thermal bypass and prevent them from sweating or corroding. A base trim element 19 is preferably installed at the bottom edge of the wall panel 21 to give the exterior wall covering a finished look at the bottom edge thereof. Base trim 19 is preferably formed from light gauge painted steel and includes an upper vertical extent 19a, a horizontal shelf 19b, and an angled return portion 19c. The base trim 19 is installed by means of panel fasteners 22 inserted through the wall panel 21, the vertical extent 19a, and the outer side wall 14a of the base channel 14. Panel fasteners 22 may be self-tapping screws similar to the fasteners used for attaching the wall panel 21 to the girts 18. A wall panel closure element 20 may be provided at the bottom edge of the wall panel 21 and supported within the wall panel 21 by the horizontal shelf 19b of the base trim element 19. Wall closure element 20 may be formed of a suitable material, such as foam, rubber, plastic, steel, etc., and is shaped to conform to the interior surface of the wall panel 21 to close off any wall panel openings. A sealant, such as non-skinning butyl sealant, may be provided between the wall panel closure element 20 and the inner surface of the wall panel 21 to augment the sealing effected by the wall panel closure element 20.

Figure 7:
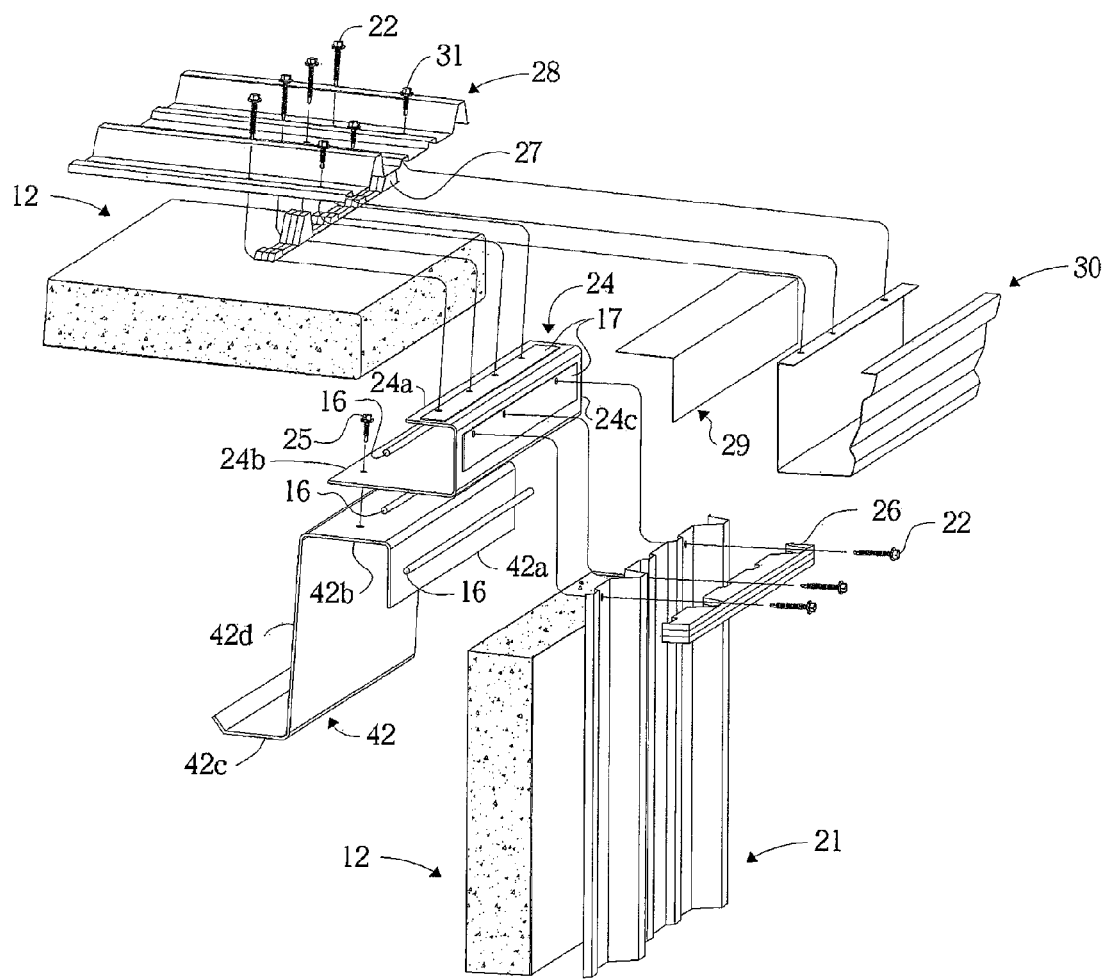
FIG. 7 is an exploded perspective view of a composite panel installation assembly at the eave of a building.

FIG. 7 is an exploded perspective view of a composite panel installation assembly at the eave of a building. The assembly includes the insulation panel 12 and wall panels 21 of the building wall 52 and the insulation panel 12 and roof panel 28 of building roof 54. The assembly further includes the eave strut 42, which is a framing element used at the transition from the roof eave to the wall. Typically the eave strut 42 is a variation of the girts 18 and the perlins 32 and is typically made of the same materials as the girts and perlins. The eave strut 42 constitutes the building component that ties together the wall cladding (comprising the insulation panel 12 and wall panels 21) and the roof cladding (comprising the insulation panels 12 and roof panels 28). The eave strut 42 comprises an upper flange 42b, a lower flange 42c, a web 42d connecting the upper flange 42b to the lower flange 42c and an outer flange 42a extending down from the upper flange 42b.

A J-channel 24 is secured to the upper flange 42b. The J-channel 24 includes a top flange 24a, a bottom flange 24b, and a connecting web 24c extending between the top flange 24a and bottom flange 24b. Bottom flange 24b may be wider in dimension than the top flange 24a. The J-channel 24 is secured to the eave strut 42 by means of fasteners, such as self-tapping screws 25 extending through the bottom flange 24b of the J-channel 24 and into the upper flange 42b of the eave strut 42. A bead or layer of sealant 16, such as non-skinning butyl sealant, may be provided between the upper flange 42b of the eave strut 42 and the bottom flange 24b of the J-channel 24.

The J-channel 24 is sized to hold an insulation panel 12. That is, the distance between the top flange 24a and the bottom flange 24b generally corresponds to the thickness of the insulation panel 12. As shown in FIG. 5, an edge of the insulation panel 12 is inserted into the J-channel 24 between the top flange 24a and bottom flange 24b. Sealant 16 may be provided between the insulation panel 12 and the bottom flange 24b.

The roof panels 28 are secured in place by means of panel fasteners 22, which may comprise self-tapping screws having an elastomeric washer to seal the panel and extending through the panel 28 and into the top flange 24a of the J-channel 24. A roof closure element 27, preferably formed of a suitable material, such as foam, rubber, plastic, steel, etc., and having a shape conforming to the interior surface of the roof panel 28, may be provided along with a suitable sealant between the roof panel 28 and the top flange 24a to close off openings in the roof panel.

As shown in FIG. 5, the width dimension of the bottom flange 24b of the J-channel 24 is preferably such that the J-channel 24 extends beyond the outer flange 42a of the eave strut 42 by a distance generally corresponding to the thickness of the insulation panels 12 of the wall 52. Accordingly, the upper edge of the insulation panel 12 of the wall 52 abuts against the bottom of the overhanging portion of the bottom flange 24b of the J-channel 24, and the upper edge of the insulation panel 12 is secured on three sides between the outer flange 42a of the eave strut 42, the bottom flange 24b of the J-channel 24, and the wall panel 21 of the wall 52. A suitable sealant 16 may be provided between the outer flange 42a of the eave strut 42 and the insulation panel 21 and between the top edge of the insulation panel 21 and the bottom flange 24b of the J-channel 24.

The wall panel 21 is secured to the connecting web 24c of the J-channel 24 by suitable fasteners 22, which may comprise self-tapping screws having an elastomeric washer. A thermal isolation tape 17 may be provided between the connecting web 24c and the wall panel 21.

An eave gutter 30 may be provided. The eave gutter 30 typically is formed from painted steel, preferably galvanized. It can be fastened to the underside of the endlap of the roof panel 28 using stitch screws 31 or similar fasteners. Gutter 30 may further include additional, secondary support (not shown).

Referring again to FIG. 7, an eave trim element 29, comprising a light gauge (26-32 gauge) galvanized metal angle element, may be provided over the top edge of the wall panel 21 to cap off the top of the wall panel 21 and prevent water from running down behind the wall panel. A wall closure element 26, preferably formed of a suitable material, such as foam, rubber, plastic, steel, etc., and having a shape conforming to the exterior of the wall panel 21, may be provided between the eave trim element 29 and the wall panel 21, and a suitable sealant may be provided to further augment the closure element 26. Instead of an eave trim element 29, some building manufactures install closure elements on the back lip of the gutter 30 between the gutter 30 and the exterior surface of the wall panel 21 to create the same effect.

The J-channel 24 is advantageous for a number of reasons. First, the J-channel helps to finish out the edges of the insulation panels 12 in a way that allows the building manufacturer to use standard trim elements, such as the eve trim 29 and the gutter 30. In addition, because the roof panel 28 is connected directly to the top flange 24a of the J-channel 24, any dimensional variations in the roof panel 28 due to thermal expansion and contraction are absorbed by shear stresses in the fasteners 22 connecting the panel 28 to the top flange 24a. By contrast, if the roof panel 28 were instead secured to the upper flange 42b of the eave strut 42a by fasteners extending through the relatively thick insulation panel 12, thermal expansions and contractions of the roof panel 28 would cause lateral bending of the fasteners, thus resulting in enlargements of the openings through which the fasteners extend through the insulation panel 12.

Figure 8:
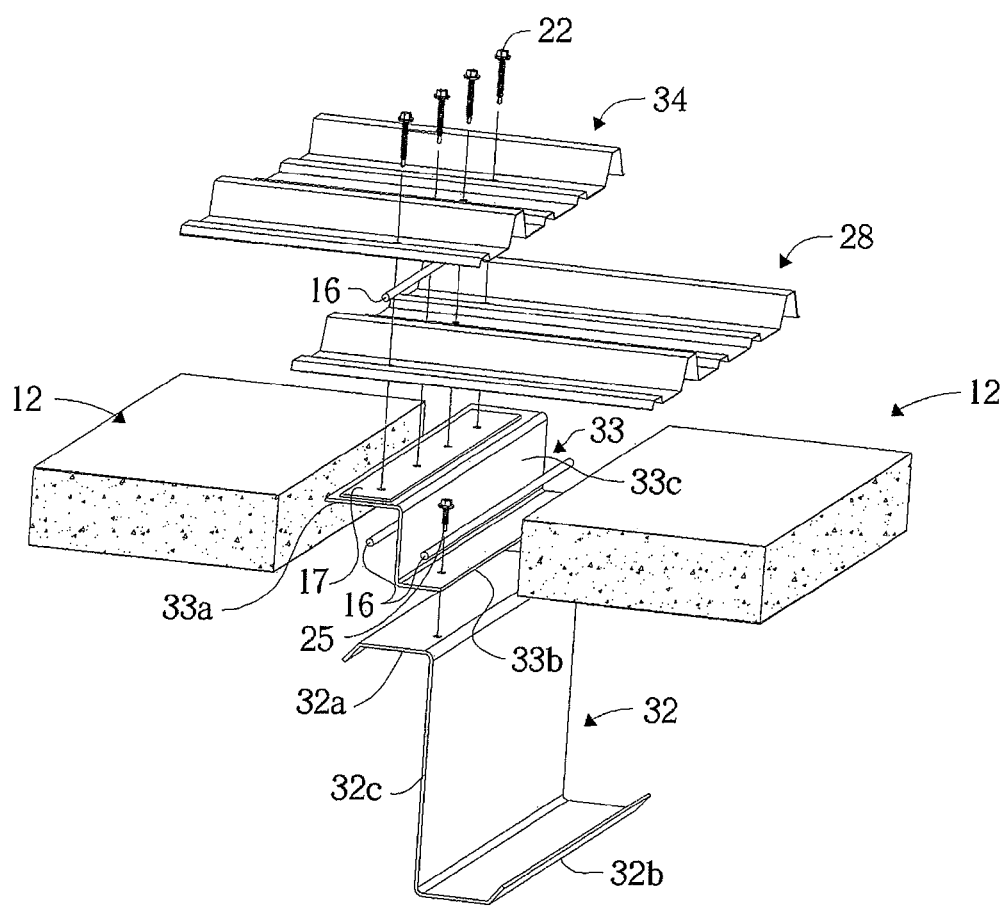
FIG. 8 is an exploded perspective view of a composite panel installation assembly at a panel lap/connection or ridge cap lap/connection.

FIG. 8 is an exploded perspective view of an insulation panel installation assembly at a panel lap connection or ridge cap lap connection. This figure illustrates a manner in which the roof cladding—comprising the roof panel 28 and insulation panel 12 or a ridge cap 34 and insulation panel 12—are secured to the perlins 32 at a seam between two abutting, or nearly abutting, insulation panels 12.

As noted above, the perlin 32 may have a Z-shape cross-section with a top flange 32a, a bottom flange 32b, and a connecting web 32c. A panel lap or ridge cap connector 33 is secured to the top flange 32a of the perlin 32. The connector 33 may comprise a heavy gauge Z-shaped element preferably made from the same material as a girt 18 or perlin 32. The connector 33 includes a top flange 33a, a bottom flange 33b, and a web 33c connecting the top flange 33a to the bottom flange 33b. Connector 33 is secured to the top flange 32a of the perlin 32 by means of fasteners, such as self-tapping screws 25, extending through the bottom flange 33b of the connector 33 into the top flange 32a of the perlin 32. A suitable sealant (not shown) may be provided between the top flange 32a of the perlin 32 and the bottom flange 33b of the connector 33.

The size of the connector 33 is based on the thickness of the insulation panels 12. That is, the height of the web 33c generally corresponds to the thickness of the insulation panels 12. As shown in FIG. 5, the insulation panels 12 are installed with edges of adjacent panels abutting opposite sides of the web 33c and the top flange 33a of the connector 33 extending over the outer face of one of the insulation panels 12. A suitable sealant 16 may be provided between the insulation panels 12 and the connector 33. Overlapping roof panels 28, or a ridge cap 34 and roof panel 28, are secured with respect to the perlin 32 by means of fasteners 22 extending through the cap 34 (or overlapping roof panel 28) and the roof panel 28 beneath and into the top flange 33a of the connector 33. A thermal isolation tape 17 may be provided on top of the top flange 33a so as to be disposed between the top flange 33a and the roof panel 28. A suitable sealant 16 may be provided between the ridge cap 34 and the underlying roof panel 28.

As described above with respect to the J-channel 24, an advantage of the connector 33 is that the roof panel 28 can be secured directly to the top flange 33a of the connector 33, instead of being connected to the perlin 32 by fasteners extending through the insulation panel 12. Thus, dimensional variations in the roof panel 28 and/or the ridge cap 34 due to thermal expansion and contraction is absorbed through a shear stress in the fasteners 22 and not by bending fasteners extending through the insulation panel 12.

Figure 9:
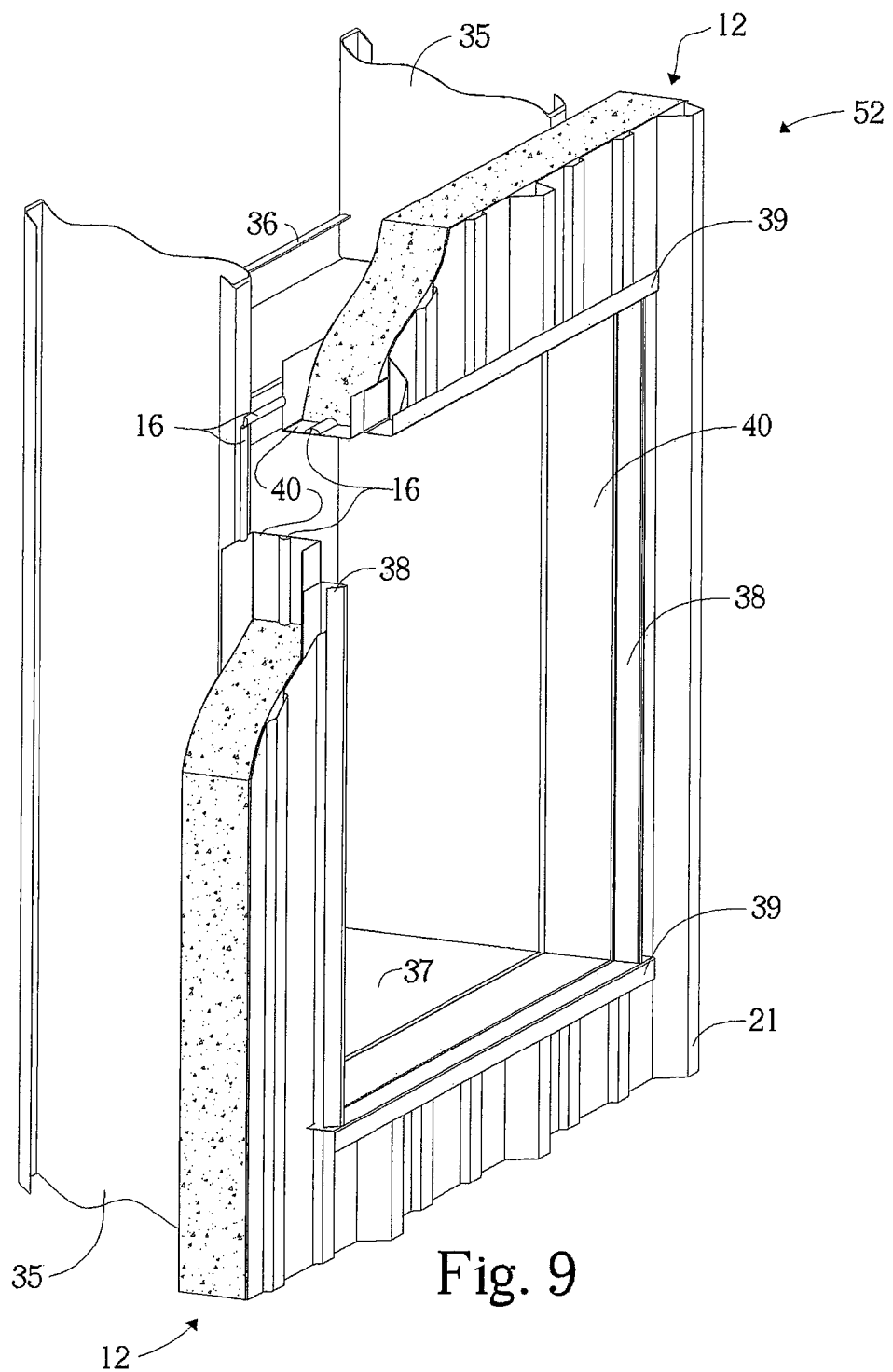
FIG. 9 is a perspective view of a typical building envelop penetration, such as walk doors, rollup door, windows, and vents

FIG. 9 is a perspective view of a typical building envelop penetration, such as, walk doors, rollup door, windows, and vents. The penetration assembly includes a window/door or building opening jam 35, which is the vertical framing for a door or window at the sides of the door or window. Typically, material for the jam 35 includes cold rolled 10 to 18 gage galvanized metal in the shape of a "C" and is typically called "C-channel." The assembly further includes a window/door or building opening header 36, which is the horizontal framing at the top of a door or window. It is typically made of cold rolled 10 to 18 gage galvanized metal. A window/door or building opening sill 37 provides the horizontal framing at the bottom of a door or window. It is typically made of 10 to 18 gage cold rolled galvanized material.

The penetration assembly further includes vertical opening J trim 38. This trim is used to cap and finish out the vertical edges of the wall panels 21 at the doors and windows. It is typically made of 22 to 29 gage painted steel. These types of finish trims come in different shapes and sizes depending on the manufacturer. (Although most are in the shape of a J). Header and sill trim 39 is used to cap and finish the top and/or bottom of the wall panel 21 when an envelope penetration is made.

Insulation panel trim 40 is used to cover the exposed edges of the insulation panel 12 when penetrating the building envelope. This trim may be color matched to the building manufacturer's trim 38 and 39. Without this trim the building manufacturer would have to redesign the trims (such as, the J trim 38 and the header and sill trim 39) to accommodate a variety of thicknesses of insulation panels 12, and such redesigned trim would not seal properly. The insulation panel trim 40 is preferably in the form of a channel having a thickness of 22-32 gage, preferably 28 gage, and having two legs, one of which is slightly longer than the other, and a connecting web having a width corresponding to the thickness of the insulation panel 12. The longer leg of the insulation panel trim 40, or trim channel, is used to attach the trim to building framing using suitable fasteners, such as tex-screws. Representative widths of the legs of the trim channel 40 are between 1 inch and 3 inches, and the legs are preferably 1.75 inches and 2 inches respectively. Suitable sealant 16 may be provided between the trim channel 40 and the edges of the composite panel 12.

What is claimed is:

1. A cladding assembly for a wall or roof of a building, comprising:
   a frame element;
   a panel-securing element comprising a first flange, a second flange, and a web securing the first flange with respect to the second flange in a spaced-apart configuration, wherein the first flange is secured to said frame element to attach said panel-securing element to said frame element;
   a plurality of insulation panels, each of said plurality of insulation panels having opposed faces defining a thickness therebetween and a first edge abutting or facing against said web of said panel-securing element with said second flange of said panel-securing element disposed over a peripheral portion of one of said opposed faces, wherein a spacing between said first and second flanges of said panel-securing element is at least as large as the thickness of said insulation panel;
   each of said plurality of insulation panels comprises a multi-layer facing material forming at least one of said opposed faces;
   said facing material includes an overhanging portion extending beyond a second edge of each of said insulation panels and an adhesive material on one side of said overhanging portion to temporarily secure each of said insulation panels adjacent to one another during installation and to form an air, thermal and moisture barrier between each of said adjacent insulation panels; and
   a steel cover panel disposed over said insulation panels, wherein each of said cover panels is attached by panel fasteners to said second flange of said panel-securing element to secure said cover panels with respect to said frame element.

2. The cladding assembly of claim 1, wherein said facing material further comprises:
   a vapor impervious skin, and
   a reinforcing layer, and
   wherein each of said insulation panels further comprises a foam core adhered to said facing material.

3. The cladding assembly of claim 2, wherein said facing material further comprises a backing secured to one side of said skin by an adhesive with said reinforcing layer disposed between said skin and said backing.

4. The cladding assembly of claim 2, wherein said reinforcing layer comprises a fiber mesh.

5. The cladding assembly of claim 1, wherein at least one of said opposed faces includes a texture imparted into the surface thereof.

6. The cladding assembly of claim 1, wherein said first and second flanges of said panel-securing element are parallel to one another.

7. The cladding assembly of claim 6, wherein said first and second flanges of said panel-securing element are generally perpendicular to said web and extend in the same direction from said web.

8. The cladding assembly of claim 6, wherein said first flange has a larger dimension in a direction perpendicular to said web than said second flange.

9. The cladding assembly of claim 6, wherein said first and second flanges of said panel-securing element are generally perpendicular to said web and extend in opposite directions from said web.

10. The cladding assembly of claim 1, wherein said panel-securing element is formed from galvanized steel and has a thickness of 10 to 18 gauge.

11. The cladding assembly of claim 1, wherein said panel-securing element is secured to said frame element by screws.

12. The cladding assembly of claim 1, wherein said frame element comprises a girt or a perlin.

13. The cladding assembly of claim 1, wherein each of said cover panels disposed over said insulation panels overlaps an adjacent one of said cover panels and is secured to said second flange of said panel-securing element.

14. The cladding assembly of claim 1, further comprising a thermal isolation material disposed between said cover panels and said second flange of said panel-securing element.

15. The cladding assembly of claim 1, wherein said panel fasteners are screws.

16. The cladding assembly of claim 1, wherein said frame element comprises an eave strut at a transition between the roof and the wall of the building, and wherein said panel-securing element extends beyond the eave strut by a distance corresponding to the thickness of an insulation panel of the wall.

\* \* \* \* \*